United States Patent
Elhamias

(10) Patent No.: US 7,596,656 B2
(45) Date of Patent: Sep. 29, 2009

(54) MEMORY CARDS WITH END OF LIFE RECOVERY AND RESIZING

(75) Inventor: Reuven Elhamias, Sunnyvale, CA (US)

(73) Assignee: SanDisk Corporation, Milpitas, CA (US)

( * ) Notice: Subject to any disclaimer, the term of this patent is extended or adjusted under 35 U.S.C. 154(b) by 383 days.

(21) Appl. No.: 11/536,192

(22) Filed: Sep. 28, 2006

(65) Prior Publication Data

US 2008/0082726 A1 Apr. 3, 2008

(51) Int. Cl.
*G06F 12/00* (2006.01)
(52) U.S. Cl. ..................................... 711/103
(58) Field of Classification Search ................ None
See application file for complete search history.

(56) References Cited

U.S. PATENT DOCUMENTS

| | | | |
|---|---|---|---|
| 5,524,231 | A | 6/1996 | Brown |
| 6,249,838 | B1 | 6/2001 | Kon |
| 7,457,910 | B2 * | 11/2008 | Chang et al. ............... 711/103 |
| 2003/0110411 | A1 * | 6/2003 | Harari et al. .................. 714/8 |
| 2003/0217323 | A1 | 11/2003 | Guterman et al. |
| 2005/0232037 | A1 | 10/2005 | Asari et al. |
| 2007/0174549 | A1 * | 7/2007 | Gyl et al. .................... 711/115 |

FOREIGN PATENT DOCUMENTS

| | | |
|---|---|---|
| EP | 1 152 339 | 11/2001 |
| WO | WO 2006/030966 | 3/2006 |

OTHER PUBLICATIONS

International Search Report and Written Opinion for PCT/US2007/068606, dated Feb. 19, 2008, 11 pages.
Written Opinion for application No. PCT/US2007/068606 dated Apr. 9, 2009, 9 pages.

* cited by examiner

*Primary Examiner*—Brian R Peugh
(74) *Attorney, Agent, or Firm*—Brinks Hofer Gilson & Lione

(57) ABSTRACT

A system and methods are given for providing information on the amount of life remaining for a memory having a limited lifespan, such as a flash memory card. For example, it can provide a user with the amount of the memory's expected remaining lifetime in real time units or as a percentage of estimated initial life. An end of life warning can also be provided. The memory device can be resized by host command. In an exemplary embodiment, a host can send a request to the memory device obtain its status and the size of logical units with which it operates. Based on this information, portions of the memory device can be erased, after which it can be reformatted and operated with a reduce capacity.

32 Claims, 7 Drawing Sheets

| current # erase cycles | current # spare blocks | | |
|---|---|---|---|
| | >1 | 1 | 0 |
| <0.8N | (N-n)/N*100% | 5% | 0%, read only |
| 0.8N...N | (N-n)/N*100% | 5% | 0%, read only |
| >N | 0% | 0% | 0%, read only | flag EOL warning
▨

MEMORY CARDS WITH END OF LIFE RECOVERY AND RESIZING

CROSS-REFERENCE TO RELATED APPLICATION

The present application is related to U.S. application Ser. No. 11/536,158, of Reuven Elhamias, entitled "End of Life Recovery and Resizing of Memory Cards," which is filed concurrently with the present application. It is also related to U.S. application Ser. No. 11/383,384, now U.S. Pat. No. 7,523,013, and Ser. No. 11/383,397, filed May 15, 2006. These applications are incorporated herein by reference in their entirety for all purposes.

BACKGROUND OF THE INVENTION

The present invention relates generally to mass digital data storage systems, and, more particularly, to the resizing of the capacity of such memory devices.

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices, which are becoming increasingly prevalent. Devices that use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

Although non-volatile memory or, more specifically, non-volatile memory storage cells within flash memory systems may be repetitively programmed and erased, each cell or physical location may only be erased a certain number of times before the cell wears out. In some systems, a cell may be erased up to approximately ten thousand times before the cell is considered to be unusable. In other systems, a cell may be erased up to approximately one hundred thousand times or even up to a million times before the cell is considered to be worn out. When a cell is worn out, thereby causing a loss of use or a significant degradation of performance to a portion of the overall storage volume of the flash memory system, a user of the flash memory system may be adversely affected, as for example through the loss of stored data or the inability to store data.

The wear on cells, or physical locations, within a flash memory system varies depending upon how often each of the cells is programmed. If a cell or, more generally, a memory element, is programmed once and then effectively never reprogrammed, the wear associated with that cell will generally be relatively low. However, if a cell is repetitively written to and erased, the wear associated with that cell will generally be relatively high. As logical block addresses (LBAs) are used by hosts, e.g., systems which access or use a flash memory system, to access data stored in a flash memory system, if a host repeatedly uses the same LBAs to write and overwrite data, the same physical locations or cells within the flash memory system are repeatedly written to and erased, as will be appreciated by those of skill in the art.

When some cells are effectively worn out while other cells are relatively unworn, the existence of the worn out cells generally compromises the overall performance of the flash memory system, which can be manifested in blocks which fail to program or erase (and eventually the system can run out of the blocks required to store data), or that have data unreliable upon reading. Although error correction techniques can be used, error correction takes time and, at some point, the system may reach a point when data storage reliability is unacceptable due uncorrectable errors or a high level of correctable errors causing excessive command (both read and write) execution latency. The system can reach this state even before it runs out of spare blocks due to program or erase block failures. In addition to degradation of performance associated with worn out cells themselves, the overall performance of the flash memory system may be adversely affected when an insufficient number of cells which are not worn out are available to store desired data. Often, a flash memory system may be deemed unusable when a critical number of worn out cells are present in the flash memory system, even when many other cells in the flash memory system are relatively unworn.

Although there are number of methods to increase the life of such memories, it would advantageous for the user to know how much life the memory has left before it is worn out and data is lost or it lapses into a read only mode. US patent application publication number US 2003/0002366 A1 describes a memory that generates a warning when number of spare storage areas is smaller than a predetermined value, but this warning is only given after the memory has reached this state and is based only the number of spare storage remaining areas at that time. It provides no evaluation based on a linearly increasing measure of wear nor indication of the remaining life as time. Consequently, there is room for improvement in providing the user with information on the state of memory and its remaining lifetime.

SUMMARY OF THE INVENTION

A host can be provided with the ability to resize capacity of a memory device, such as a flash or other memory card. In an exemplary embodiment, the resizing can be used in the end of life (EOL) context to be able to extend the usable life, at a reduced capacity, of a memory device. A host can also be provided with the ability to resize the capacity of a card through a set of commands for this purpose. In one embodiment, a set of commands to extend the life of a memory device include a first command to request the memory device's status; a second command for the memory device to report to the host the size of the logical units with which the card operates; and a third command to resize the capacity of the memory device. In response to the resize capacity command, the card or memory device will then erase a specified number of logical units. The card will then update its database for its protocol accordingly. The card can indicates to the host when this process is complete and the card can then be logically reformatted.

Additional aspects, advantages and features of the present invention are included in the following description of exemplary examples thereof. All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

The invention may best be understood by reference to the following description taken in conjunction with the accompanying drawings in which:

FIG. 1b is a diagrammatic representation of a memory system, e.g., memory device 120 of FIG. 1a.

DETAILED DESCRIPTION OF EXEMPLARY EMBODIMENTS

Figure 1A:
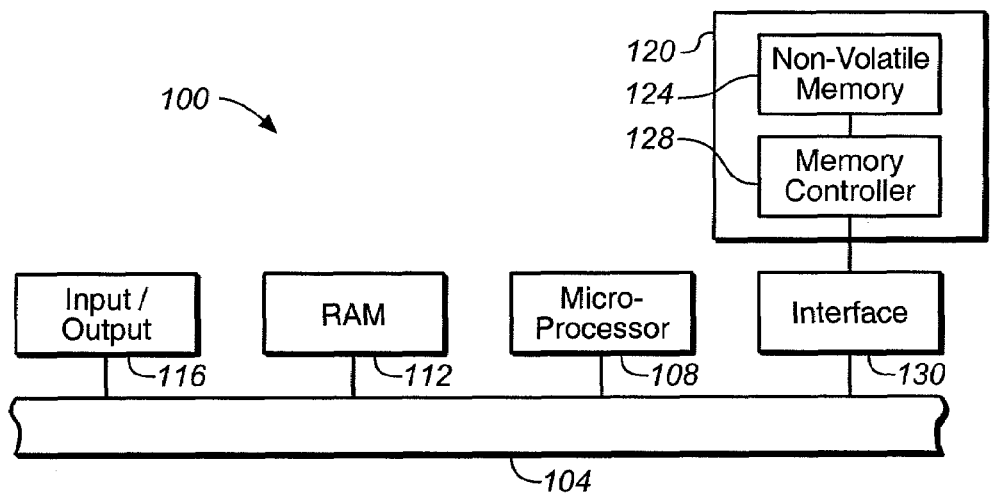
FIG. 1a is a diagrammatic representation of a general host system which includes a non-volatile memory device.

The present invention is related to providing the user with information of on the remaining lifetime and End of Life (EOL) information for a memory card or other memory device of limited lifetime. While the embodiments described herein describe non-volatile EEPROM based memory systems, the various aspects of the present inventions are applicable to any type of storage medium susceptible to "wear". For example, an emerging type of non-volatile memory technology is phase-change memory. Information is stored by changing the phase of a given material. A number of other examples of such systems are given in U.S. patent application Ser. No. 10/841,379. Such systems also may be prone to "wear", where the storage medium is less capable of storing information as the number of times the medium has been cycled increases. The present inventions can be readily applied to such technologies.

A number of methods of improving memory life are known, such as using "gentler" operating values or algorithms (such as in intelligent erase or programming processes), wear leveling (described, for example, in U.S. patent application Ser. No. 10/686,399), using margin values (described, for example, in U.S. Pat. No. 5,532,962), operating multilevel memories in a binary mode (described, for example, in U.S. Pat. No. 6,456,528), or methods of encoding and storing the data (such as described in U.S. patent application Ser. Nos. 11/321,217 and 11/320,916). Although these and other techniques can improve how long the memory will last, it will still, eventually, reach a point of unacceptable remaining usable capacity (due to the block failures) or performance (speed, reliability). It would be of great utility to users to have some indication of when this is likely to occur, allowing them to plan accordingly.

The present invention has a number of aspects and embodiments. According to a first of these, a memory card or other memory device can provide the user with the amount of life remaining in terms of time units (hours, days). In another embodiment, the card can provide the amount of life it has remaining in terms of a percentage of its initial that remains. In either option, the memory can also provide an EOL Warning, which is an indication that the card reached some relative ages, say 80 or 95% of life is over. Although the discussion is primarily given using a memory card-type embodiment, the various aspects of the present invention can be implemented for memory system that can be detachably connected to a host (such as memory cards, USB devices, and so on), embedded memory systems, etc.

The present invention provides several methods for calculating a relative end of life. For example, the percentage of remaining life can be base on the number of erases per memory block or adjustable if the number of spare blocks becomes too low. As mentioned above, in the other embodiments the adjustment can be made according to the error rate upon reads, program and erase time, block failure rate etc. These methods can also provide for an EOL warning flag. The calculation of a memories remaining life in real units of time can be made by the card based on calibration information from the host or on measurements made by the host, among other methods. In other aspects of the invention, a number ways to display the end of life information are presented.

A. Memory Organization and Basic Definitions

Referring initially to FIG. 1a, a general host system that includes a non-volatile memory device, e.g., a memory card such as a CompactFlash memory card, will be described. A host or computer system 100 generally includes a system bus 104 that allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing or storing information including, but not limited to, still image information, audio information, video image information or other types of data. Such information may be captured in real-time, and may be transmitted to host system 100 in a wireless manner. While host system 100 may be substantially any system, host system 100 is typically a system such as a digital camera, a video camera, a cellular communications device, portable computing device, an audio player, a video player, or other digital appliance. It should be appreciated, however, that host system 100 may generally be substantially any system which stores data or information, and retrieves data or information. It may also be a system that either only captures data or only retrieves data. That is, host system 100 may be a dedicated system that stores data, or host system 100 may be a dedicated system which reads data. By way of example, host system 100 may be a memory writer that is arranged only to write or store data. Alternatively, host system 100 may be a device such as an MP3 player that is typically arranged to read or retrieve data, and not to capture data.

A non-volatile memory device 120 is arranged to interface with bus 104 to store information. An optional interface circuit block 130 may allow non-volatile memory device 120 to communicate with bus 104. When present, interface circuit block 130, e.g., and interface, serves to reduce loading on bus 104. Non-volatile memory device 120 includes non-volatile memory 124 and a memory control system 128. In one embodiment, non-volatile memory device 120 may be implemented on a single chip or a die. Alternatively, non-volatile memory device 120 may be implemented on a multi-chip module, or as multiple discrete components. One embodiment of a non-volatile memory device 120 will be described below in more detail with respect to FIG. 1b. Non-volatile memory device 120 may be substantially any suitable non-volatile memory device, e.g., a removable memory card or an embedded sub-system.

Non-volatile memory 124 is arranged to store data such that data may be accessed and read as needed. The processes of storing data, reading data, and erasing data are generally controlled by memory control system 128. In one embodiment, memory control system 128 manages the operation of non-volatile memory 124 such that its lifetime is substantially maximized by essentially causing the different sections of non-volatile memory 124 to be worn out at substantially the same rate. For example, the memory controller can implement one of many wear leveling techniques such as recycling blocks with low wear with those in areas experiencing active wear. Some examples of wear leveling techniques are given in U.S. patent application Ser. No. 10/990,189, filed Nov. 15, 2004.

Non-volatile memory device 120 has generally been described as including a memory control system 128, i.e., a controller. Specifically, non-volatile memory device 120 may include separate chips for non-volatile memory 124 and controller 128 functions. By way of example, while non-volatile memory devices including, but not limited to, PC cards, CompactFlash cards, MultiMedia cards, and Secure Digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip. Additionally, the controller may be located on the host system, and the non-volatile memory device 120 connected to the controller on the host through a connector or any other type of interface. Regardless, the scope of the present inventions encompasses all different forms and combinations of a memory system, wherein the level of wear within a memory medium is controlled by a control system. For example, the controller may be implemented within software on the microprocessor of the host system.

Figure 1B:
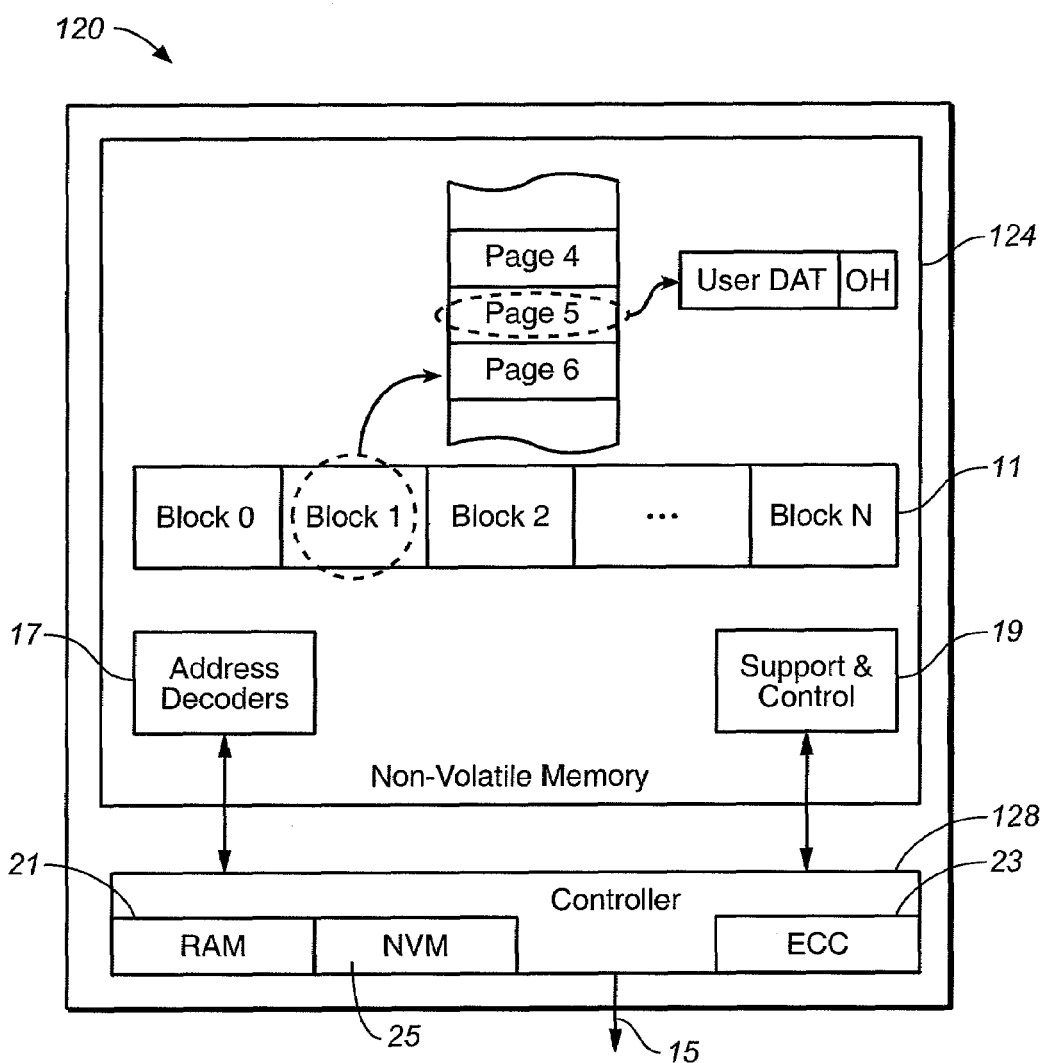

With reference to FIG. 1*b*, one example of a non-volatile memory device 120 will be described in more detail. It should be appreciated that FIG. 1*b* shows an embodiment of non-volatile memory device 120 that includes a single flash memory chip 124 and a separate controller 128. Memory 124 may be an array of memory cells along with suitable addressing and control circuitry formed on a semiconductor substrate, wherein one or more bits of data are stored in the individual memory cells by storing one of two or more levels or distributions of charge in individual memory elements of the memory cells. A non-volatile flash electrically erasable programmable read only memory (EEPROM) is an example of a common type of memory for such systems.

In the described embodiment, controller 128 communicates over a bus 15 to a host computer or other system that is using the memory system to store data. Bus 15 is generally a part of bus 104 of FIG. 1*a*. Control system 128 also controls operation of memory 124, which may include a memory cell array 11, to write data provided by the host, read data requested by the host and perform various housekeeping functions in operating memory 124. Control system 128 may include a general-purpose microprocessor or microcontroller that has associated memory, various logic circuits, and the like. One or more state machines are often also included for controlling the performance of specific routines.

Memory cell array 11 is typically addressed by control system 128 through address decoders 17. Decoders 17 may apply the correct voltages to word and bit lines of array 11 in order to program data to, read data from, or erase a group of memory cells being addressed by the control system 128. Additional circuits 19 may include data registers to temporarily store data being read or written, programming drivers that control voltages applied to elements of the array that depend upon the data being programmed into an addressed group of cells, and state machines to control sequencing of the various voltages and control signals. These support and control circuits 19 may also include some amount of non-volatile memory for counters or other control information. Circuits 19 may also include sense amplifiers and other circuits necessary to read data from an addressed group of memory cells. Data to be programmed into array 11, or data recently read from array 11, are typically stored in a buffer memory 21 within control system 128. Control system 128 also usually contains various registers for temporarily storing command and status data, and the like. Control system 128 may also include some amount of non-volatile memory 25 where it can store various control data that it wants to maintain even when powered down. In other cases, the control system 128 may keep any such permanent records in non-volatile memory 124.

In one particular embodiment, array 11 is divided into a large number of BLOCKS 0-N of memory cells. In the preferred embodiment, a block is a unit of erase, the minimum number of memory cells that are erased together. Each block is typically divided into a number of pages, as also illustrated in FIG. 1*b*. A page is the minimum unit of programming and one or more sectors of user data are typically stored within each page. A sector is the smallest unit of logical data that the host will address or transfer to or from the non-volatile memory. In disk drive applications, this is typically 512 bytes. Some non-volatile memories allow partial page programming in which the individual bits remaining in an erased state after a first programming can be programmed in subsequent page program operations without first erasing the page. Some multistate memories may even allow bits already programmed in a lower programmed state to be programmed into a higher state in subsequent page program operations. In these memories, sectors or even portions of sectors may be programmed at different times. Nevertheless, one page remains the basic unit of programming; it is just that some bits may be masked out and programmed later. The present inventions can be applied to any suitable memory system regardless of the physical implementation of the units of erase, read and/or write.

As shown in FIG. 1*b* of the described embodiment, one page may include both user data and overhead data. Overhead data typically includes an error correction code (ECC) that has been calculated from the user data contained in the page, and the ECC may include some or all of the overhead data. A portion 23 of the control system 128 calculates the ECC when data is being programmed into array 11, and also checks the ECC when data is being read from array 11. Overhead data may also include the logical address of the user data, the physical addresses of the page and/or block, address map information, the number of erase cycles experienced by the physical block, encryption information and/or other statistics or data. Part or all of the overhead data may be stored in each page, as illustrated in FIG. 1*b*. Alternately part or all of the overhead data may be stored in a specific location within each block, or it may even be stored in a block separate from the user data. The ECC stored in the overhead data can be used to give some indication of the reliability of associated data read by indicating the number of bits in error. The memory system controller can track the frequency and magnitude of such errors. This information provides a parameter by which the wear of a group of cells can be inferred.

One sector of data is most commonly included in each page but two or more sectors may instead form a page, or a page may be smaller than a sector. For example, U.S. Pat. Nos. 5,890,192 and 5,430,859 describe programming and reading data in units of chunks, in which a chunk is a fraction of a sector. In some memory systems, one sector is included in one page, and one page may form a block. More commonly, in NAND memory systems one or more sectors are included in each page, and 8, 16, or 32 pages form a block. In other memory systems blocks are formed from a relatively large number or pages such as 512, 1024, or even more pages. The number of blocks is chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, referenced earlier.

The tracking algorithm and various end of life techniques described in more detail in the following sections are carried on the controller 128 using its CPU (not explicitly shown), although some of the operations can be executed on the memory 124, depending on the capabilities it includes. The ECC hardware and software 23 provides quantity information (number and magnitude of errors, or number of error bits) about errors based on, for example, BCH or Reed-Solomon methods. A card interface will allow the various EOL information to be reported out to the host and, in implementation where it is required, time to be communicated from the host to the storage device.

B. Relative End of Life Calculations: Main Principles

The Relative EOL Calculation method gives an approximate remaining lifetime of the card, expressed in percentage of total lifetime. Memories usually maintain an "experience count" or "hot count" expressing the number erase-program cycles the memory has experienced. An average hot count can be calculated by simply counting all of the erase operations and dividing the value by the number of blocks. For example, in the memory systems described in US patent publications numbers US-2005-0144360-A1, US-2005-0141313-A1, US-2005-0141312-A1, US-2005-0166087-A1, and US-2005-0144365-A1, which can be taken as the exemplary embodiment for following description, this would be the number of blocks in the MML space. Alternatively, in systems using a wear leveling cyclic pointer, this can be done by counting the number of times the wear leveling cyclic pointer wraps around the card. For example, in the Cyclic Wear Leveling method described in U.S. Pat. No. 6,230,233 U.S. patent applications Nos. 10/990,189, 10/686,399, and 10/281,739, every count will be a function (typically linear) of X average erases per, where X is the number of erases performed between Wear Leveling Exchange operation. The current number of spare meta-blocks, or other logical or physical units of erase, can also be taken into account. If the number of spares (or program or erase time) falls down (or error rate goes up) dramatically, the "percentage of life" calculated on the basis of average hot count can be adjusted.

Figure 2:
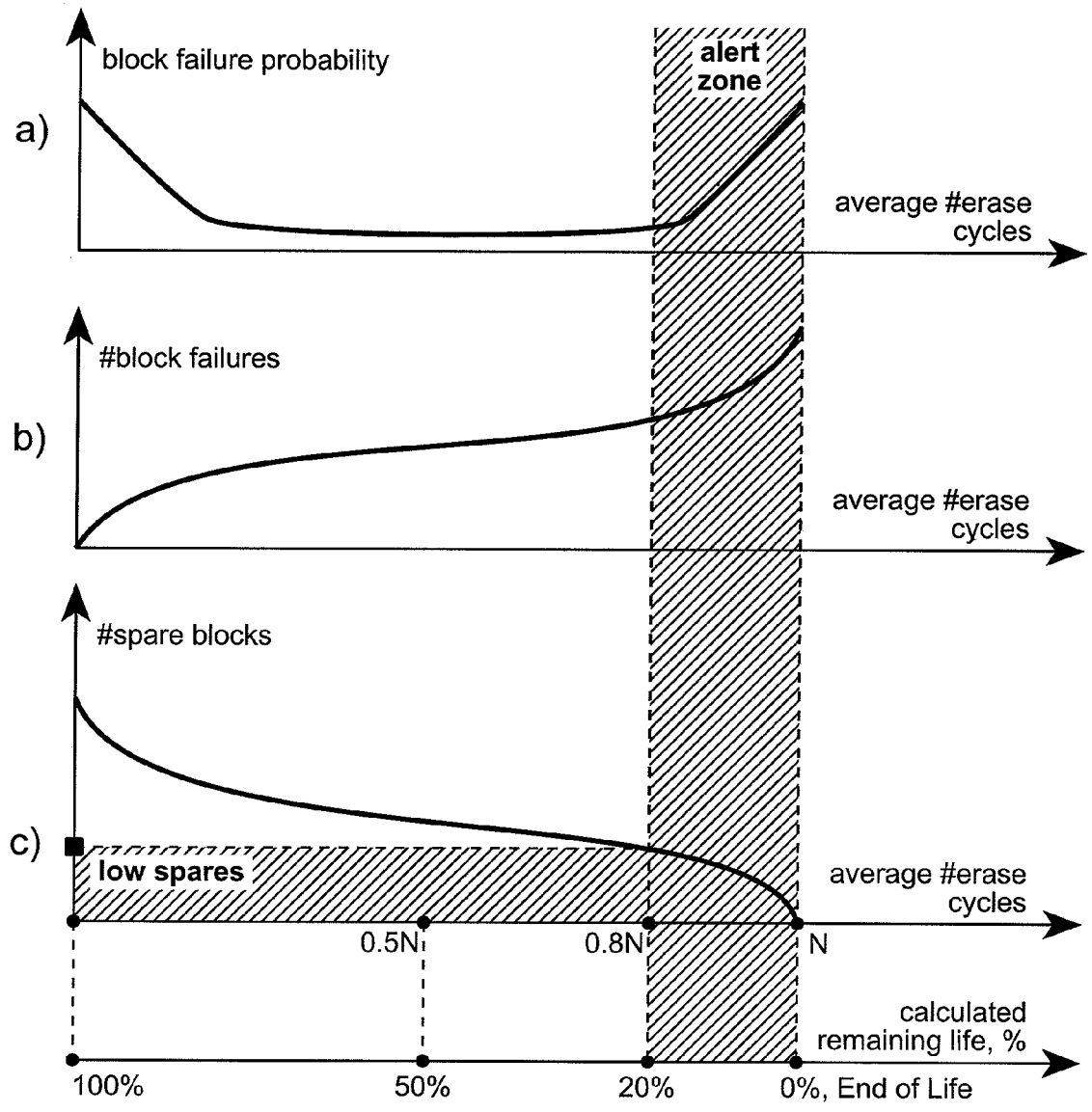
FIG. 2 shows a typical case of an end of life calculation.
Figures 3, 4:
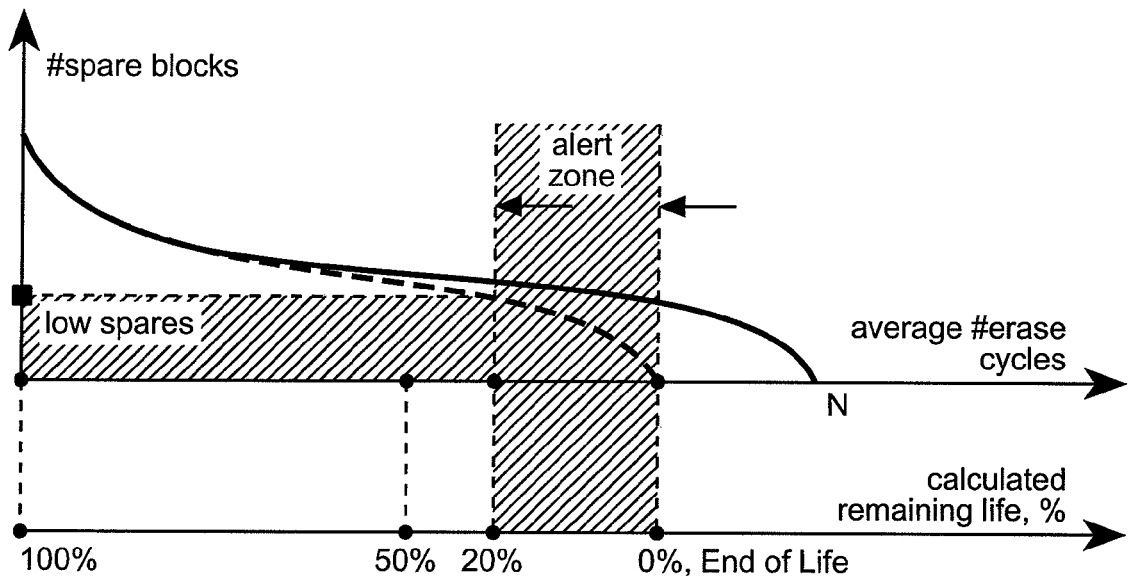
FIG. 3 shows the case where the degradation of memory blocks is faster than expected.
FIG. 4 shows an exemplary embodiment for an end of life calculation

Some of the main principles of an end of life (EOL) calculation are illustrated in FIGS. 2a-c and 3, where FIGS. 2a-c show a typical end of life case and FIG. 3 the situation when the memory blocks degrade faster than expected. In this particular example, the adjustments will be made based on only the number of block failures and number of spare blocks. More generally, other parameters (error rate, program or erase time, etc.) can be taken into account. In the typical case, the block failure probability (FIG. 2a) has a bath tub dependency on the number of average block erase cycles, where the upraising steep slope is specific to the memory type (floating gate EEPROM, dielectric, etc.) and conditions, such as operating voltage and temperature. In an initial phase, weak or defective cells will fail relatively rapidly, after which the probability will stay more or less flat through most of the device's life. As the memory cells begin to wear out, the probability will steepen as the end of life is approached and the alert zone entered. The EOL calculation method is based on the usage of this dependency, which can also be presented in another form, as a dependency of number of failed blocks on the number of average block erase cycles (FIG. 2b). For every given product, the typical, or worst case, dependency should be known in order to make a realistic EOL calculation.

FIG. 2c shows this same information in terms of the number of spare blocks remaining on the device. In addition to showing an alert zone base on a percentage (here, 80%) of lifetime elapsed, FIG. 2c also shows a range ("low spares") where the number of available spare blocks becomes dangerously low.

FIGS. 2a-c show the case where the memory device follows the expected degradation pattern. More generally, however, the rate of degradation may differ from the expected level or change as the device is operated. For example, part way through its life the device may be used in more extreme operating conditions, resulting in an increased rate of deterioration. This is shown in FIG. 3. The solid line is the same as shown in FIG. 2c, the broken line the shifted value due to faster deterioration. As can be seen, the degradation rate starts as expected, but then increases more rapidly than would be expected based just on the standard number of expected erase cycles.

The EOL calculation is based on a comparison of the current number of average block erases n to the maximum number of block erases N, where N is an expected realistic, or worst case, number of erase cycles average block on the card can stand. N highly depends on the memory type; the voltage range; the operating temperature range; access patterns; and initial number of spare blocks, among other things. The main problem is to get a reasonably accurate block failure dependency as a function of the parameters. The remaining card's life is normally calculated in percent relative to N:

Remaining life, %=$(N-n)/N*100\%$.

For example, if n is 0.8N, then Remaining Life=20%.

Another way of indicating EOL can be indication that card reached certain level of wear. In this example, an EOL Warning is flagged when the card is believed to be 80 percent worn out and the card is in the "alert" working zone. The warning flag can be set internally and will be indicated to the host if a special command is issued. If the average number of erase cycles reaches N, then 0% remaining life should be indicated while the card should keep working fully until it runs out of spare blocks. When the card runs out of spare blocks it should go to a Read-Only mode.

In addition to the erase cycle based calculation, the EOL calculation can be adjusted if the ongoing degradation of blocks on the card diverges from the expected block failure distribution, such as is shown in FIG. 3. FIG. 3 illustrates that in this case the alert can be triggered not by the high number of erase cycles per block, but by the low level of remaining spare blocks. Thus, the EOL calculation based on the number of erased cycles is corrected to match the real state of the card. The simplest implementation can be just setting the low EOL value, say 5 percent, and alert if there is only one spare block left. The EOL calculation in this case will follow the rules summarized in the table of FIG. 4.

FIG. 4 shows one particular embodiment of the end of life calculation that takes into account both the number of erase cycles that the memory has been through and the number of spare blocks. The number of erase cycles will increase continuously with the number of accesses, while the number of spare blocks will decrease discontinuously. The rows correspond to the number of erase cycles expressed in terms of the expected lifetime, N, where N can be updated as the device is operated, being increased or decreased depending on usage. The first row is the safe range of less than 0.8N, the second row the alert zone of 0.8N to N, and the bottom row for when the expected lifetime has been reached. The first column is for when more than spare block remains, in which case the lifetime is expressed as the expected percentage remaining. The second column is for when only a single spare block remains, in which case the lifetime is set to default value of 5%, unless N is reached, in which case this value is overridden and set to 0%. The last column is for when no spare blocks remain, in which case the lifetime is taken as 0% and the device will, in the exemplary embodiment, lapse into a read only mode. The upper left corner is the safe operating zone, with the rest of the first column and all of the second column the alert zone when the EOL flag will be set, with the device further going into read only mode in the last column.

More generally, based on one or more end of life criteria being met or approached, the memory of the various embodiments described can change its behavior in one or more ways. In addition to going into a read only mode or change its behavior, the memory could slow down various operations, vary their algorithms, reduce the number of special purpose blocks (such as the update blocks in the exemplary embodiment in US patent publication US-2005-0144365-A1), and so on.

Upon receiving end of life information, the system can inform or warn the user in a number of ways. For example, it can provide this information to the user through a status bar and update this display as the end of life estimate is updated. In addition to any actions that the user may take based on this information, depending on the embodiment the host itself can take steps itself. For example, the warning can be passed with the host's operating system or to various applications. This can then lead to the activation of back-up processes or the shut-down of the application, part or all of the host system.

As mentioned above, although the embodiments described above uses the number of erases, the number of spare blocks, or a combination of these, other parameters can also be used in combination with or instead of these parameters as a metric for age. For example, the adjustment could also be based on memory cell behavior by incorporating things such as block failure rate (based on, say, the distance between program and/or erase failures), ECC results, the program or erase time, or other characteristics that indicate cell age. The ECC results that can be used can include the number of errors, either maximum or per unit of data, the magnitude of these errors (if the ECC method used supplies these), the frequency of such errors, or some combination of these.

Even when there are no read error under normal conditions, margin reads (such as those described in U.S. Pat. No. 5,532, 962) can be employed to estimate data retention quality, where the various reference voltages can be provided from the controller, the memory chip itself, another memory chip, or even the host according to various embodiments. These various adjustment parameters can be individually used as the only estimation parameters for EOL. For example, number of spare blocks alone can be used alone to judge the EOL. Also, there is often a correlation, or even overlap, between the various parameters, but a better result can often be achieved by taking into account more parameters. For example, there may be plenty of spare blocks, but slow programming speed, which would indicate that the EOL is near. In the hypothetical case of identical cells, all of these ideal cells would fail at the same time and would show the same error rate upon data reads. Also, there may be spares, and program time is not too long, but error rate is high. This would similarly indicate that EOL is near due to poor data retention.

C. End of Life Calculation in Time Units—Main Principles

The EOL calculation in time units, such as hours, days and weeks, can be based on the usage pattern and access frequency of the card. In the case of an even usage pattern, the calculation of remaining life in time units can be done if there is a system clock and the card's usage rate is measured. In the example below, the remaining life in hours can be calculated as a function of the current number of erase cycles per block n and the current number of erases per block per day:

$$\text{Remaining Life (hours)}=(N-n)/(N*\text{\#erases per block per hour}).$$

Figure 5:
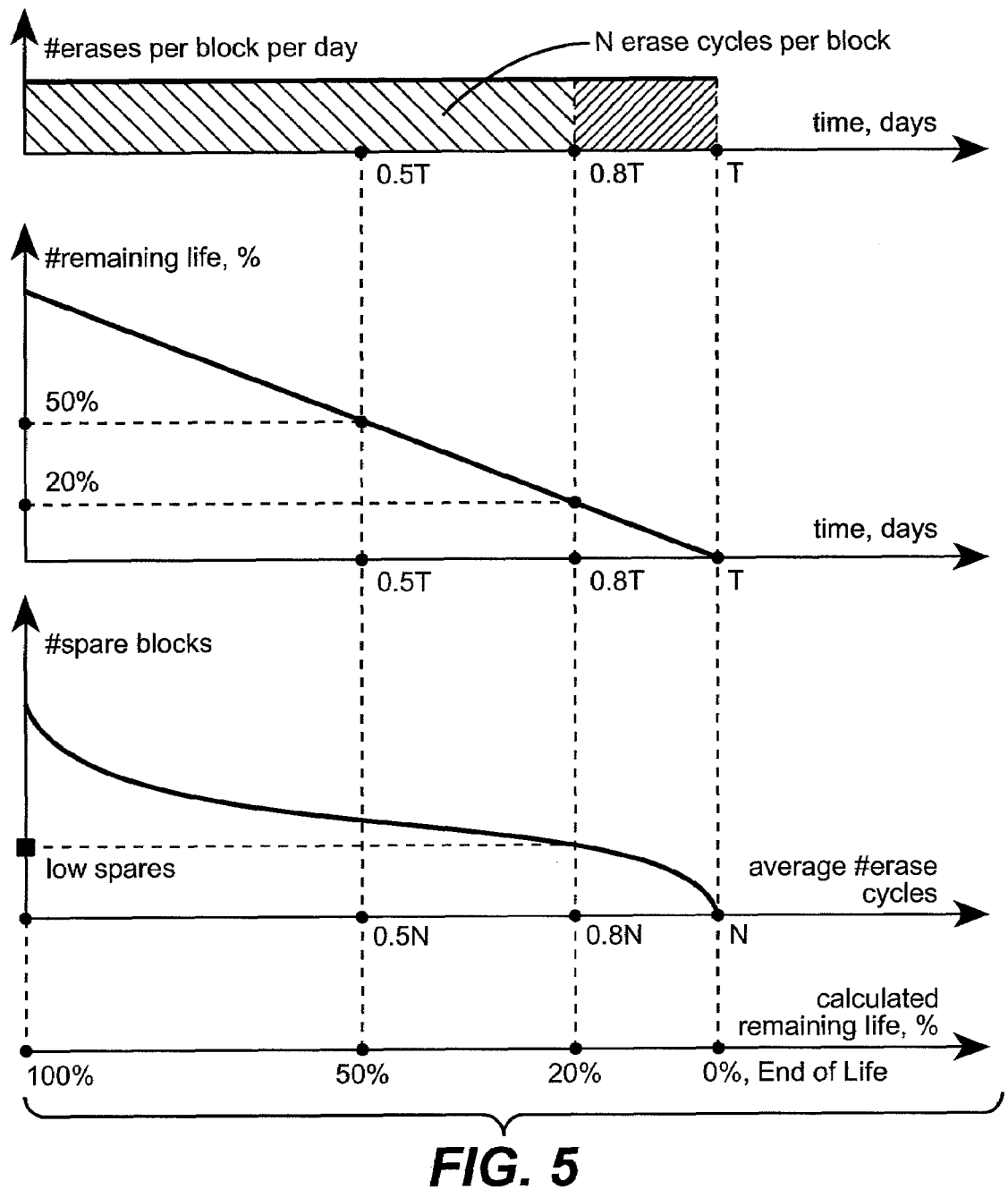
FIG. 5 illustrates even usage of a memory device.

In this case, the time T as shown in FIG. 5 is overall card's life which corresponds to the state when card reaches the level of N average erases per block. Similarly, the level of 20% of life still remaining will mean that the card's remaining lifetime is 0.2T.

FIG. 5 shows the constant rate of aging situation, either due to even usage and consistent operating conditions or as an approximation of a more complicated situation. The top part of FIG. 5 show the usage rate, here taken as even throughout the lifetime, where the alert zone is taken as when 80% of the card's lifetime (0.8T) has elapsed. The upper graph is a straight line indicative of even wear, while lower graph shows the number of spare blocks.

Figure 6:
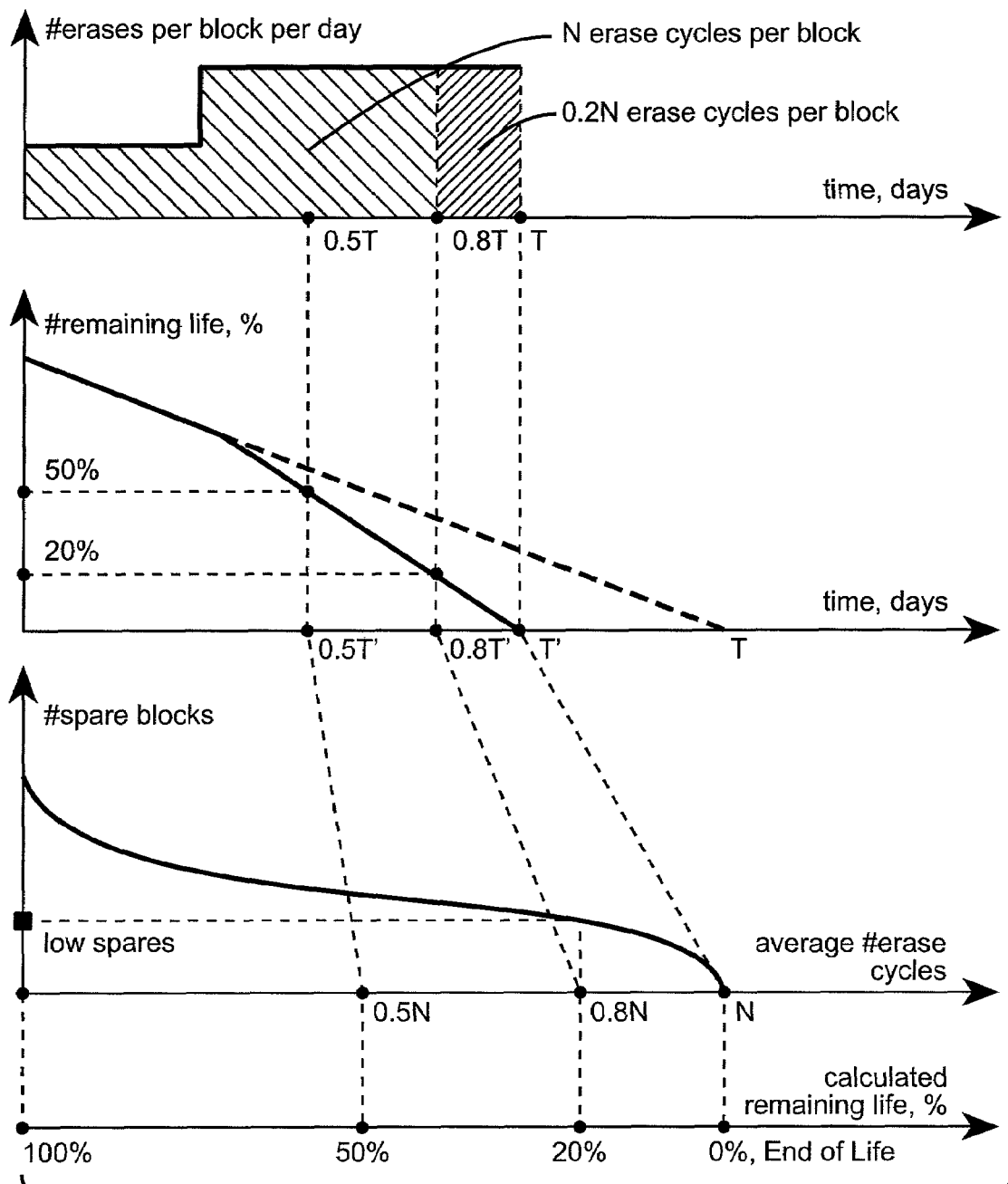
FIG. 6 illustrates uneven usage of a memory device.

If the card's usage is uneven, then the EOL calculation based on the current usage rate can be adjusted to match the changes in the usage rate. FIG. 6 illustrates the case when the card's usage rate increases and the calculation of the end of life time T is recalculated to the new value T as the card is expected to reach the level of N erases per block much sooner.

As shown at the top portion of FIG. 6, the usage level (in terms of number of erases per day) in this example is taken as constant at a first level for about the first third of the expected lifetime, when it then increases to a higher rate of usage. As the rate of usage (number of erases per block per day) increases, the percentage of remaining life will decrease more rapidly. This is reflected in the remaining life graph, which begins at a first, constant slope. If the usage remained even, this would continue on as shown in the broken line. Due to the increased number of erases, the slope instead steepens, reflecting shorter expected lifetime. The alert zone will again be triggered at 0.8T. Although this is now sooner, it may be that the number of decreases at the same rate as for the even usage case, as shown in the bottom graph of FIG. 6.

In order to express the amount of lifetime remaining in real time units, the above method needs some time reference, such as system clock, in order to measure the current usage rate. In cases where the card's usage has a periodic pattern, then it may be difficult for the card to recognize the pattern and make an accurate EOL calculation. The following section describes one embodiment of calculating the remaining life in time units in a card which has no system clock.

D. Calibration by Host

Figure 7:
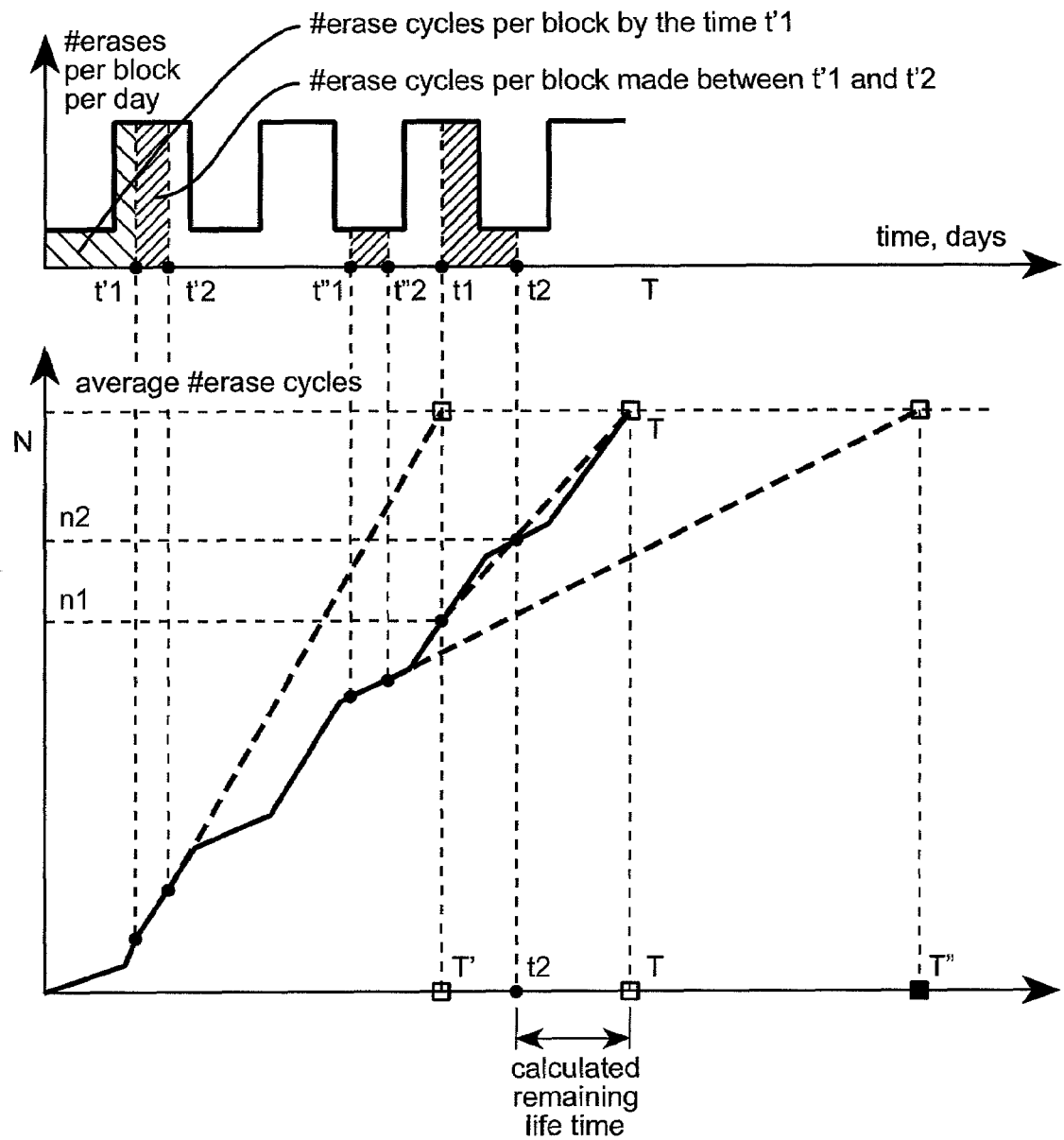
FIG. 7 shows calibration and end of life calculation in time units.

In the calibration by host embodiment, the host, which has a real-time system clock, can use a special command to send current time values to the card. Also, if timing information is present in the standard working mode (for example, if the file attributes contain creation time of the last update in the file itself and/or in the directory record for the file), this information can be extracted by the system without special command. The simplest example would be to monitor directory updates and check the time/date information for the file entries. The card can then use those values to calculate the current usage rate and then the remaining card's lifetime. FIG. 7 illustrates the method in the case when the card's usage has a periodic pattern, which is a typical case for many applications, for example network hubs, where the usage pattern has specific highs and lows during the day or week. In order to do an accurate measurement, the host sends the current time values at least twice, say at time $t_1$ and $t_2$. The card needs to store the average number of erase cycles per block $n_1$ and $n_2$ experienced by the card by time $t_1$ and $t_2$, correspondingly, as well as the time values themselves. The remaining life can then be calculated as:

$$\text{Remaining life (days)} = T - t_2 = (N - n_2) \ast (t_2 - t_1)/(n_2 - n_1),$$

where N is the expected maximum number of erases per block, and T is the expected end of life time. Then, the estimation for remaining card's life can be read by the host with a special command. A simple implementation would be to use a single command to send the new current time value and read the new estimation of remaining lifetime.

FIG. 7 shows the estimated lifetime being adjusted several times based to reflect usage. It also shows how this updating can be used accurately and inaccurately. In the exemplary embodiment, the reference time period between two commands would cover at least one typical period of the card's usage. If the period between two commands is too short then the calculation can be inaccurate. As is illustrated in FIG. 7, if the commands are issued during usage high ($t'_1$ and $t'_2$) or low ($t''_1$ and $t''_2$), the end of lifetime calculation (T' and T'' correspondingly) can be far from the correct one (T). If the host application issues the command, say at the same time once a week, the EOL calculation can be more accurate. The use of times $t_1$ and $t_2$ reflect a choice that reflects a more accurate choice of a sample period. The assumption here is that the host has some knowledge of the typical usage pattern, or at least the period of the pattern, better then the card.

E. "Real Time" EOL Measurement by the Host and Further Improvements

An alternative method can be based on doing the usage rate measurements by the host itself. In this case, the host periodically reads relative remaining life values in percentages $l_1$ and $l_2$ from the card at time $t_1$ and $t_2$. The host's application use these values and times and do the following calculation:

$$\text{Remaining life (days)} = l_2 \ast (t_2 - t_1)/(l_2 - l_1).$$

Thus, the card with an EOL calculation in percentages only can be used to provide the EOL calculation in time units.

The various aspects of the present invention can be extended to include a number of further improvements. For example, as the card or other memory device can be used in different application, the "real time" EOL measurement based on any of these methods can be supported by a special host utility. The host utility can issue the time value or perform the EOL calculation itself. Such a utility can support multiple cards identifiable by, say, some ID. For example, photo professionals can use such a utility on weekly basis and read the remaining life values from their cards.

Additionally, although the above discussion has considered the case where, in addition to the number of erase cycles, only the current number of spare blocks or meta-blocks is considered, other aspects affecting the EOL calculation can also be included. For example, the host's peak write rate can also be included in the EOL calculation. Further, as mentioned above, other parameters like error rate (with or without special margins), program/erase time, ECC results, or other methods can be incorporated. These various indications of device age can be used alone or variously combined to provide accurate indications of a device remaining lifetime according to its use.

F. End of Life Recovery and Card Resizing

As discussed in the preceding sections, as flash (and other) memories have an endurance limit, there is some maximum number of write cycles that the memory can endure before having write failures on the host side. Once the flash card hits the endurance limit, the host will begin to encounter write or erase failures, eventually running out of free write blocks and leading to the rejection of write commands. Eventually, the card can lapse into a read only mode with no further write operations allowed. In the present section, a host is provided with the ability to resize the capacity of a card. In an exemplary embodiment, this is done by providing the host with a set of commands for this purpose, allowing the card to be used for further write operations. Although these commands are described primarily in the end of life (EOL) context, they can be used more generally for memory resizing purposes. Note that by reducing the card's capacity just in its logical format (DOS, FAT, and so on) alone is not sufficient, as this will not free up any physical blocks.

In an exemplary embodiment, the following set of commands can be used to extend the life of a flash memory in the field by reducing its capacity:

GetCardStatus
GetLogicalUnitSize
ResizeCapacity

The GetCardStatus command can be any of the EOL status requests described in the preceding sections. This will indicate to the host whether the card has reached its end of life or how close it is to doing so. According to a number of variations, as also described above, this status may be sent from the card to the host without a specific request, such as when the card reaches the alert zone or when the card lapses into a read only mode. In addition to providing the status, this command can also include the minimum number of logical units needed to be erased for the card to recover. In other embodiments, this information need only be sent if the amount of remaining life has fallen below some threshold or may be sent in response to a separate command. In cases where the card automatically sends an end of life warning, it can also supply the minimum erase of logical units to recover automatically or in response to a separate command.

In response to the GetLogicalUnitSize command, the card will report to the host the size, for example as the number of sectors, of each logical unit with which the card operates. For example, the actual size of a logical unit can be the number of sectors in a metablock. The host can use this number for calculating the number of sectors it is going to free out of the card's capacity and send the ResizeCapacity command to erase these sectors. As the host may already have knowledge of the logical unit size, this command may not be needed. In another variation, this information could also be sent to the host together with the minimum erase unit information, whether in response to the GetCardStatus command or automatically.

Figure 8:
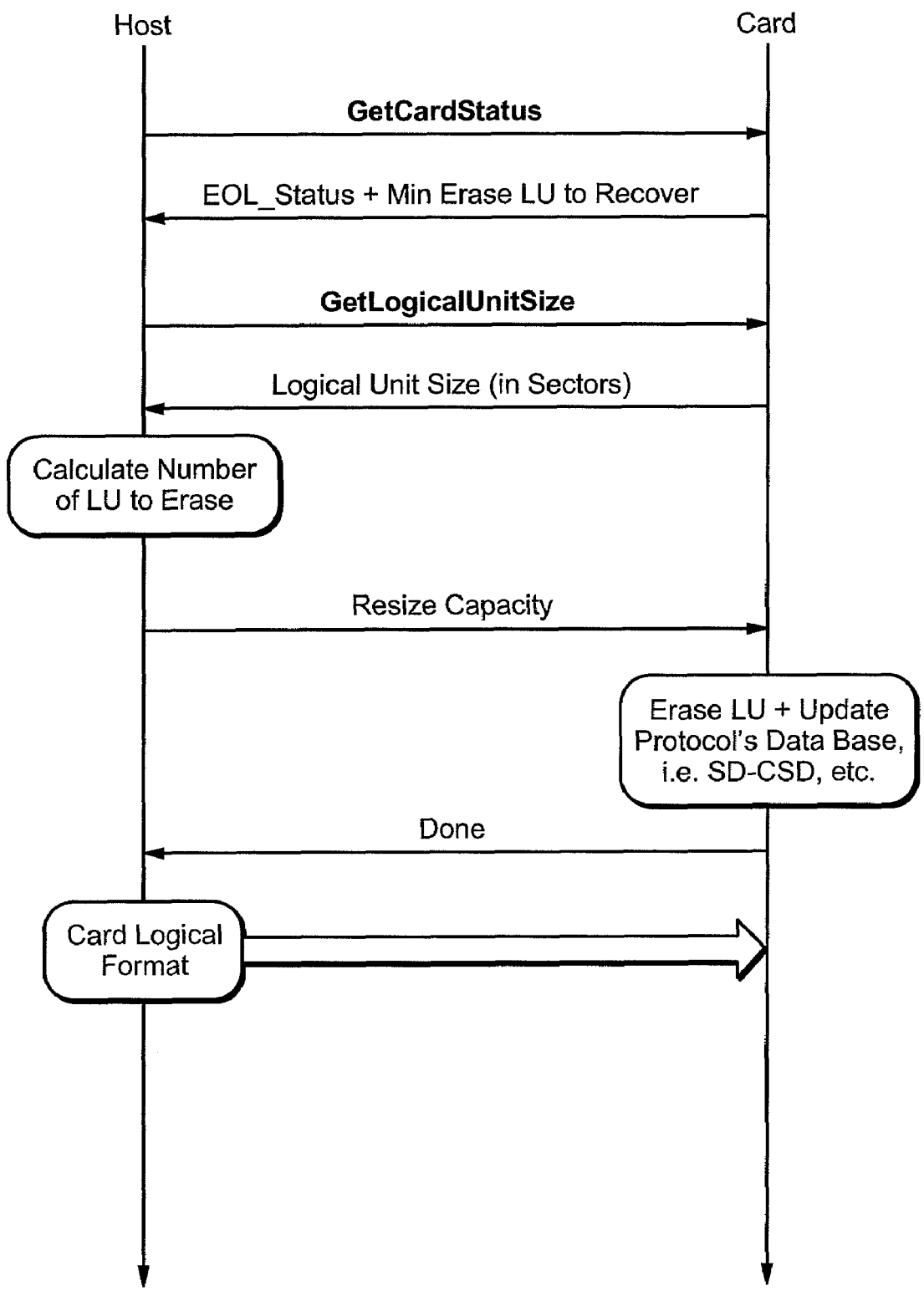
FIG. 8 shows an example of host-card negotiation for EOL recovery.

In response to the ResizeCapacity command, the card will then erase the specified number of logical units. The card will then update its database for its protocol accordingly. For example, in the case of an SD card the Card Specific Data, or CSD, register (from which a host can calculate the memory device's capacity) would be updated. The card indicates to the host when this process is complete. As the card's capacity has changed, the host will then logically reformat the card into the new format. For example, if the host sets the card's reduced capacity, the host can be responsible to subsequently update a file system being used with the new size before further use of the card. The host can backup any important data and decide what data will not be written back after the recovery process is completed. FIG. 8 shows the process for the exemplary embodiment.

As the capacity of the memory device is reduced, the user, host, or some combination will need to erase some of the logical units. From the card's capacity and the logical unit size, the number of logical units can be obtained. In one set of embodiments, the user could then decide which logical units would be erased to free up memory. The ResizeCapacity command can then instruct the card to erase some number of logical units by including the details of which logical units to erase as part of the command.

Although described in the end of life (EOL) context, such a card resizing may be utilized for other applications. For example, a host could keep data in the end of the card (in logical terms, as a last logical unit segment) and keep it hidden from other users by reducing the perceived capacity of the card by the size of this logical unit, so that, as the segment is not visible to other users it will not be accessed. For another example, there may be circumstances where card capacity is reduced during manufacturing by downgrading a larger capacity card to a smaller capacity card by effectively taking out a significant number of sectors from the apparent address space. The introduction of a ResizeCapacity command gives the host the capability to participate in this process for both EOL recovery and other purposes. One application (which can be used in the EOL context) would be to ship a card with an actual physical capacity of, say, 128 MBytes labeled as 64 MBytes and have the system use only 64 MBytes, keeping the other 64 MBytes in reserve as fresh memory. When the first 64 MBytes nears the end of its usable life, the card can notify the host and have the host start using the second, fresh 64 MBytes partition by, for example, issuing a command to copy the contents of the first partition into the second partition. It is appropriate for the host to do this, as opposed to being automatically executed by the card, as it would take a "long" time (in that it would greatly exceed the amount of time which could transparently be hidden), and the host would preferable make the decision.

Therefore, the present examples are to be considered as illustrative and not restrictive, and the invention is not to be limited to the details given herein, but may be modified within the scope of the appended claims.

It is claimed:

1. A memory device, comprising:
a memory having a plurality of physical memory segments each having a plurality of non-volatile memory cells and organized into logical units, wherein the memory cells each have a lifetime of a finite number rewrite cycles;
rewrite circuitry connectable to said memory cells whereby the memory cells can be rewritten; and
a controller, wherein the controller logically accesses the memory as having a first accessible physical memory capacity and, in response to a command from a host to which the memory device is connected, subsequently logically accesses the memory as having a second accessible physical memory capacity, where the second accessible physical memory capacity is less than the first accessible physical memory capacity;
wherein the controller maintains a parameter indicative of the number of rewrites the memory cells have undergone, determines an indication of an expected amount of remaining lifetime of the memory device based on a value of said parameter, and provides said indication of the expected amount of remaining lifetime to the host, and
wherein said command from the host to the memory device to reduce the accessible physical memory capacity is in response to said indication of the expected amount of remaining lifetime of the memory device.

2. The memory device of claim 1, wherein said indication of the expected amount of remaining lifetime of the memory device is provided from the memory device to the host in response to a status request from the host.

3. The memory device of claim 1, wherein said indication of the expected amount of remaining lifetime of the memory device is provided from the memory device to the host in response to the expected amount of remaining lifetime being less than a predetermined value.

4. The memory device of claim 1, wherein said indication of the expected amount of remaining lifetime of the memory device is provided from the memory device to the host in response to the memory device transitioning to a read only mode.

5. The memory device of claim 1, wherein said indication of the expected amount of remaining lifetime of the memory device includes a number of logical units to erase.

6. A memory device, comprising:
a memory having a plurality of physical memory segments each having a plurality of non-volatile memory cells and organized into logical units; and
a controller, wherein the controller is configured to logically access the memory as having a first accessible physical memory capacity, transmit to a host an indication of an expected amount of remaining lifetime of the memory, receive a command from the host responsive to the indication of the expected remaining lifetime, and in response to receiving the command, subsequently logically access the memory as having a second accessible physical memory capacity, where the second accessible physical memory capacity is less than the first accessible physical memory capacity.

7. The memory device of claim 6, the memory further including: erase circuitry attachable to the memory cells wherein, in response to said command from the host, the memory device is configured to erase a number of logical units of said non-volatile memory.

8. The memory device of claim 7, wherein the controller operates the memory device according to a protocol and, in response to said command, the controller updates the protocol by which the memory device operates.

9. The memory device of claim 8, the memory device including one or more registers, wherein updating the protocol includes resetting one or more register values from which the host can determine the capacity of the memory device.

10. The memory device of claim 8, wherein updating the protocol includes changing the number of physical memory segments into which the controller organizes each of said logical units.

11. The memory device of claim 8, wherein subsequent to completing said erase of a number of logical units of said non-volatile memory, the controller sends an indication that the erasing is complete to the host.

12. The memory device of claim 8, wherein said command supplies the number of logical units of said non-volatile memory to erase.

13. The memory device of claim 6, wherein the memory cells each have a lifetime of a finite number rewrite cycles, the memory device further including: rewrite circuitry connectable to said memory cells whereby the memory cells can be rewritten, and wherein the controller maintains a parameter indicative of the number of rewrites the memory cells have undergone, determines an indication of the expected amount of remaining lifetime of the memory system based on the value of said parameter, and provides said indication of the expected amount of remaining lifetime to the host, and wherein said command from the host to the memory device to reduce the accessible physical memory capacity is in response to said indication of the expected amount of remaining lifetime of the memory device.

14. A method of operating a memory device including a plurality of physical memory segments each having a plurality of non-volatile memory cells and organized into logical units, wherein the memory cells each have a lifetime of a finite number rewrite cycles, the method comprising:
   operating the memory device where a host accesses the memory device as having a first accessible physical memory capacity;
   maintaining a parameter indicative of a number of rewrites the memory cells have undergone, determining an indication of an expected amount of remaining lifetime of the memory device based on a value of said parameter, and providing the indication of the expected amount of remaining lifetime to the host;
   in response to providing the indication of the expected life to the host, receiving a command from the host to reduce the accessible physical memory capacity from said first accessible physical memory capacity to a second accessible physical memory capacity; and
   subsequently operating the memory system where the host accesses the memory device as having an accessible physical memory capacity of the second accessible physical memory capacity.

15. The method of claim 14, wherein, in response to said command from the host to reduce the accessible physical memory capacity, the memory device erases a number of logical units of said non-volatile memory.

16. The method of claim 14, wherein, in response to said command from the host to reduce the accessible physical memory capacity, the memory device updates the protocol by which the memory device operates.

17. The method of claim 15, wherein subsequent to said erasing a number of logical units of said non-volatile memory, the memory device sends an indication the erasing is complete to the host prior to the host accessing the memory device as having an accessible physical memory capacity of the second accessible physical memory capacity.

18. The method of claim 14, wherein said indication of the expected amount of remaining lifetime of the memory device is provided from the memory device to the host in response to a status request from the host.

19. The method of claim 14, wherein said indication of the expected amount of remaining lifetime of the memory device is provided from the memory device to the host in response to the expected amount of remaining lifetime being less than a predetermined value.

20. The method of claim 14, wherein said indication of the expected amount of remaining lifetime of the memory device is provided from the memory device to the host in response to the memory device transitioning to a read only mode.

21. A method for operating a memory device, the memory device having a plurality of physical memory segments each having a plurality of non-volatile memory cells and organized into logical units, the method comprising the memory device:
   operating in a first mode, where the memory device provides a first accessible physical memory capacity to a host, in response to an access request from the host;
   transmitting to the host an indication of an expected amount of remaining lifetime of the memory device;
   in response to transmission of the indication of the expected amount of remaining lifetime, receiving a command from the host at the memory device to reduce accessible physical memory capacity from the first accessible physical memory capacity to a second accessible physical memory capacity; and
   subsequent to receiving the command, operating in a second mode where the memory device provides the second accessible physical memory capacity in response to a subsequent access request.

22. The method of claim 21, wherein, in response to the command from the host to the memory device to reduce accessible physical memory capacity, the memory device erases a number of logical units of the non-volatile memory cells.

23. The method of claim 22, wherein, in response to the command from the host to the memory device to reduce accessible physical memory capacity, the memory device updates a protocol by which the memory device operates.

24. The method of claim 23, wherein updating the protocol by which the memory device operates comprises resetting one or more register values accessible by the host and indicative of a capacity of the memory device.

25. The method of claim 23, wherein updating the protocol comprises changing a number of physical memory segments which are organized into each of the logical units.

26. The method of claim 23, wherein subsequent to said erasing a number of logical units of said non-volatile memory, the memory device sends an indication the erasing is complete to the host prior to the host accessing the memory device as having an accessible physical memory capacity of the second accessible physical memory capacity.

27. The method of claim 22, further comprising receiving the number of non logical units of the memory for erasure as part of the command from the host to the memory device to reduce accessible physical memory capacity.

28. The method of claim 21, further comprising reformatting the memory device prior to operating the memory system where the host accesses the memory device as having an accessible physical memory capacity of the second accessible physical memory capacity.

29. The method of claim 21, further comprising the memory device providing to the host the indication of the expected amount of remaining lifetime of the memory device in response to a status request from the host.

30. The method of claim 21, further comprising the memory device providing the indication of the expected amount of remaining lifetime of the memory device to the host in response to the memory device determining that the expected amount of remaining lifetime is less than a predetermined value.

31. The method of claim 21, wherein the indication of the expected amount of remaining lifetime of the memory device is provided from the memory device to the host in response to the memory device transitioning to a read only mode.

32. The method of claim 21, wherein the indication of the expected amount of remaining lifetime of the memory device includes a number of logical units to erase.

* * * * *

UNITED STATES PATENT AND TRADEMARK OFFICE
CERTIFICATE OF CORRECTION

PATENT NO. : 7,596,656 B2  Page 1 of 1
APPLICATION NO. : 11/536192
DATED : September 29, 2009
INVENTOR(S) : Reuven Elhamias It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this

Twenty-eighth Day of September, 2010

David J. Kappos
*Director of the United States Patent and Trademark Office*